United States
Borg

[11] 3,914,990

[45] Oct. 28, 1975

[54] DYNAMIC TERRAIN SIMULATOR

[75] Inventor: Henry Arthur Borg, Romeo, Mich.

[73] Assignee: The United States of America as represented by the Secretary of the Army, Washington, D.C.

[22] Filed: July 18, 1974

[21] Appl. No.: 489,870

[52] U.S. Cl. .................................................. 73/71.7
[51] Int. Cl.² ........................................... G01M 17/04
[58] Field of Search .......... 73/71.7, 117, 126, 71.6, 73/11, 12

[56] References Cited
UNITED STATES PATENTS
3,520,180  7/1970  Polhemus et al. .................... 73/71.7

FOREIGN PATENTS OR APPLICATIONS
616,429  10/1926  France .................................. 73/117

Primary Examiner—Richard C. Queisser
Assistant Examiner—John P. Beauchamp
Attorney, Agent, or Firm—John E. McRae; Peter A. Taucher; Robert P. Gibson

[57] ABSTRACT

A dynamic terrain simulator adapted to support various wheeled and/or tracked vehicles with essentially no modification or alteration of the simulator structure. In its preferred form the simulator includes an endless belt running over a number of closely spaced rollers extending transverse to the vehicle's longitudinal axis. Fluid cylinders are provided to rapidly raise and lower each roller, thereby imparting load forces on the wheels or tracks of the vehicle. The belt may be powered to simulate various vehicle speeds and running conditions.

12 Claims, 17 Drawing Figures

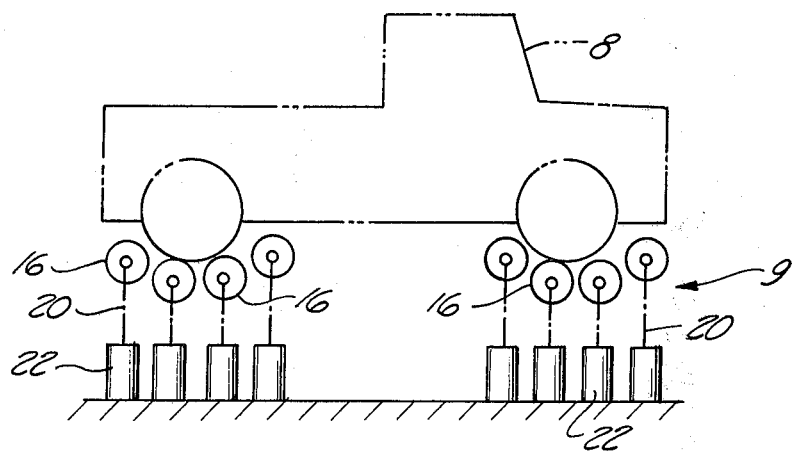
Fig-1
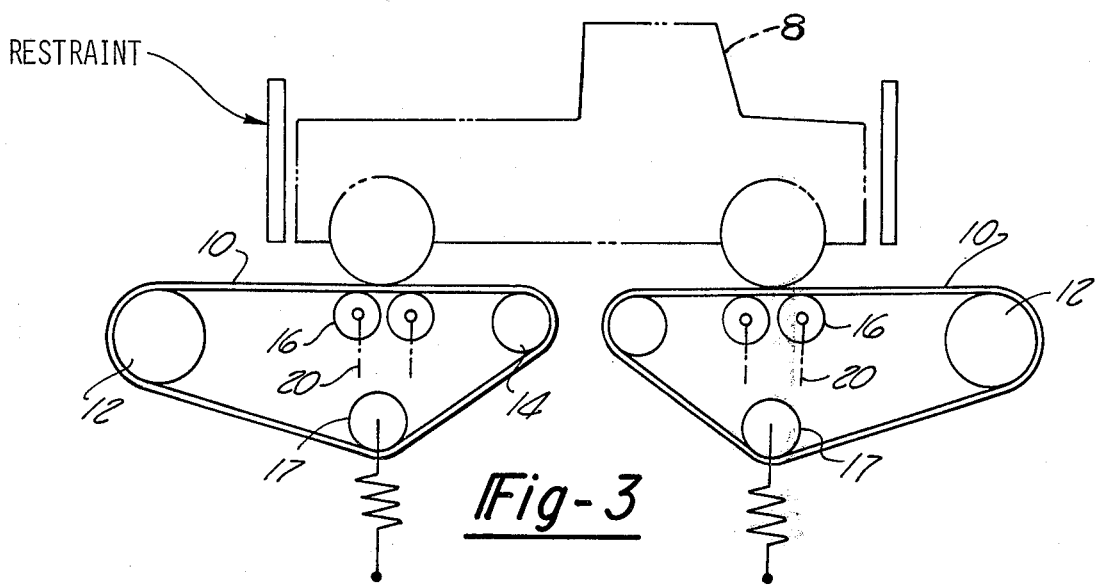
Fig-3
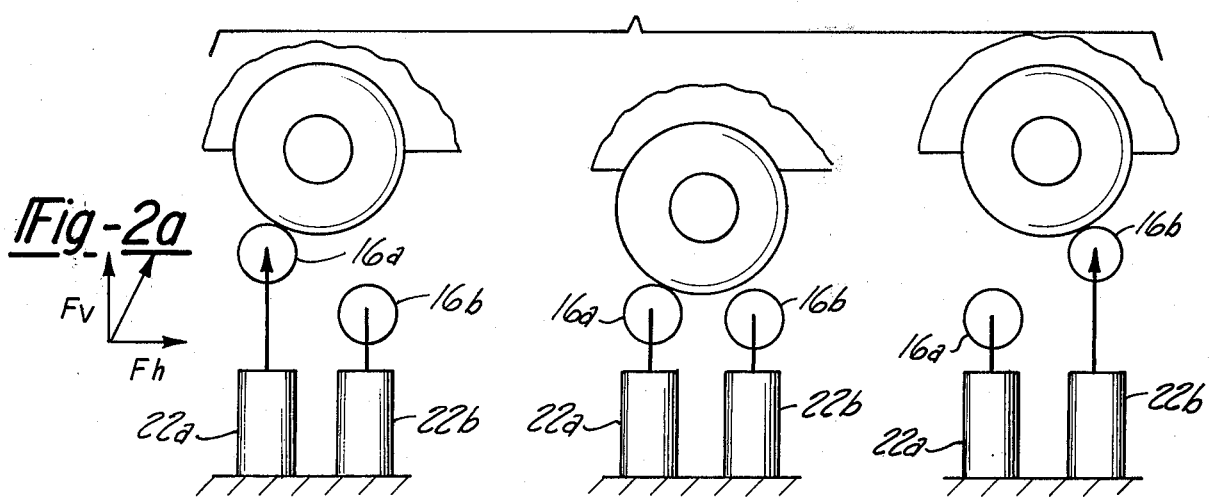
Fig-2a
Fig-2

SIDE HILL OPERATION

DYNAMIC TERRAIN SIMULATOR

BACKGROUND AND SUMMARY OF THE INVENTION

Vehicles of the wheeled and tracked type are commonly tested for durability and roadability, by running them over test tracks that include gravel surfaces, cobblestones, spaced wooden blocks, hills, curves, and other surface contours representative of severe service conditions. The test surfaces do not provide exactly reproducible results, but are somewhat dependent on the driver's driving habits, the vehicle speed, and other factors. Also, considerable test time is required to obtain a representative number of driving hours.

Laboratory devices have been developed for imparting shaker forces to a restrained motionless vehicle. See for example my U.S. Patent Application Ser. No. 312,418 filed Dec. 5, 1972 (now U.S. Pat. 3,827,289) and entitled "Vehicle Test Fixture."

The present invention relates to a vehicle shaking and testing device of the laboratory type. The device of this invention is particularly designed for testing capability on a variety of wheeled and tracked vehicles, e.g. small wheelbase automobiles and trucks, longer and wider heavy-duty trucks, relatively light military reconnaissance vehicles, and heavy-duty tracked vehicles such as military tanks and bulldozers.

The testing device is preferably designed to impart vibrational loads to the vehicle at varying frequencies (cycles per second), thereby simulating a great number of driving hours in a comparatively short period of time.

In its most versatile form the device is capable of adjustment to provide side hill simulation testing at varying vehicle speeds, e.g. from 5 to 55 miles per hour. The vehicle can be tested with the engine running under various loads or with the engine shut off.

A principal aim of the invention is to provide testing capability on a wide variety of vehicles without requirement for time-consuming adjustments of the testing device or the vehicle. Preferably the vehicle is merely driven onto the testing device and then chained down or otherwise restrained preparatory to the actual test. There is no necessity to remove the vehicle wheels or other vehicle components, as is the case with many previous testing devices.

THE DRAWINGS

FIGS. 1 through 9 are schematic representations illustrating the theory of operation of my invention.

FIGS. 1 AND 2

Figure 4:
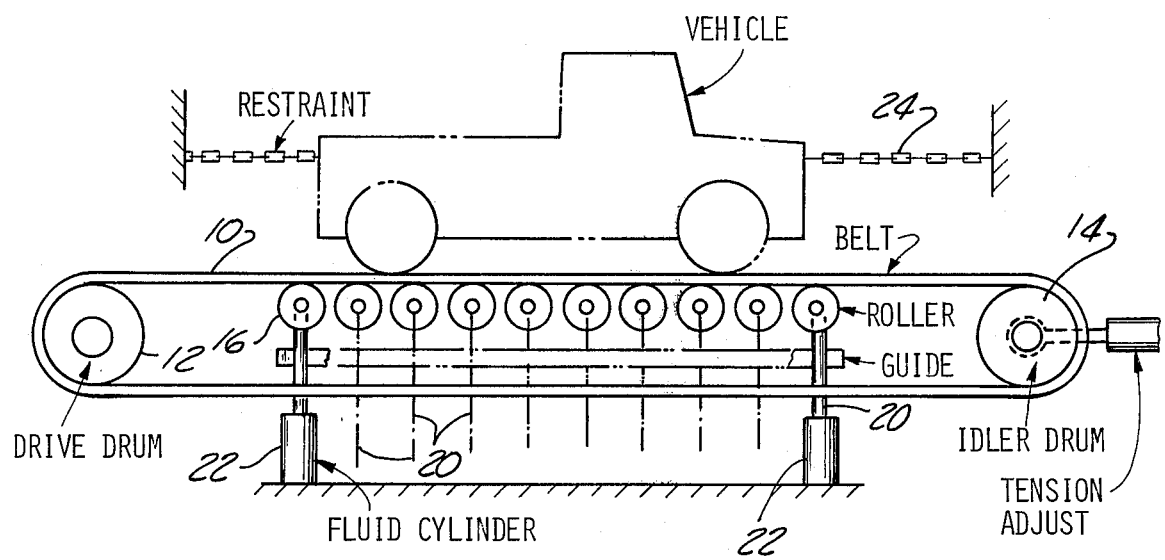
Figure 5:
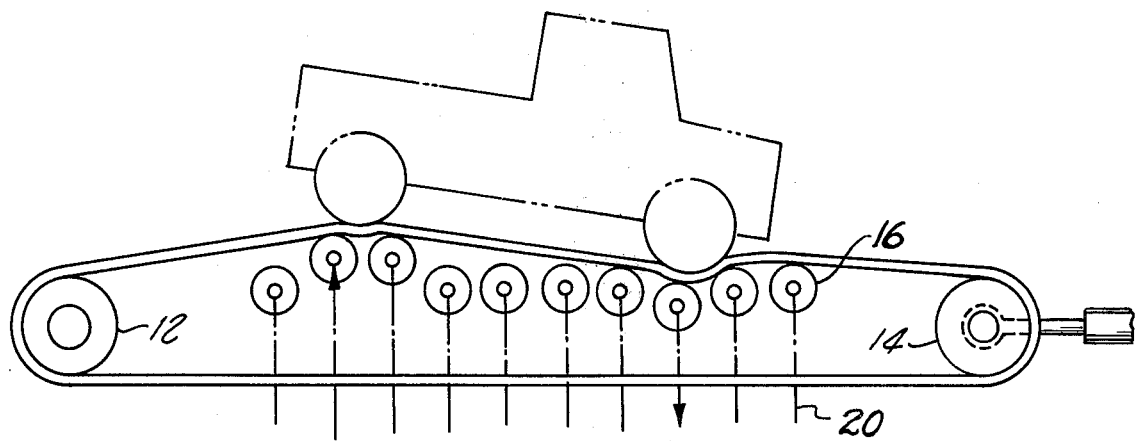

There is diagrammatically shown a wheeled vehicle 8 supported on a testing device 9 that includes a series of wheel-deflecting rollers 16 extending transverse to the vehicle's front-to-rear axis. As shown, each wheel of the vehicle rests on two of the rollers.

Each wheel-deflecting roller is mounted at its ends on support rods 20 that are oscillatable in the vertical direction by means of fluid cylinders 22. Assuming eight rollers 16, there would be sixteen fluid cylinders, two for each roller.

Vertical oscillation of an individual roller by its fluid cylinders 22 provides a vertical force input to the vehicle wheels. If the cylinders are energized at a sufficiently high frequency, e.g. from approximately 5 cycles per second up to approximately 100 cycles per second, the force inputs will be representative of service forces out on the road.

FIG. 2 shows various relative positions taken by the rollers and vehicle wheel during the oscillatory motion. Assuming the left roller 16a is moving upwardly as indicated by the arrow in the leftmost portion of FIG. 2, then an upward vertical force $F_v$ will be imparted to the vehicle wheel; additionally, since the vertical force is applied in a vertical plane offset from the wheel centerline there is a horizontal force component $F_h$ imparted to the vehicle wheel.

As roller 16a returns to its lowered position, as shown in the central portion of the FIG. 2 sketch, the vehicle wheel is accelerated downwardly by the vehicle weight and suspension system, thereby producing an upward reaction force on the vehicle when roller 16a reaches the lowered position. If roller 16a is then retained in its lowered position and the adjacent roller 16b powered upwardly by its cylinders 22b, as shown in the rightmost portion of the FIG. 2 sketch, then roller 16b imparts vertical and horizontal load forces on the vehicle wheel. By suitably programming the various fluid cylinders 22a and 22b it is believed possible to simulate service load forces encountered by the vehicle during travel over rough or bumpy terrain.

It is contemplated that the various fluid cylinders will be controlled by conventional program tapes having a number of tracks corresponding to the number of fluid cylinders used. The stroke length of each roller and the frequency of roller oscillation would presumably be dependent on the characteristics of the fluid cylinders and the hydraulic system, as well as other factors such as the response time of the electro-hydraulic servo valves used to control the cylinders. It is believed possible to achieve stroke lengths of twenty four inches and oscillation frequencies on the order of fifty cycles per second.

OSCILLATION CONTROL

Each wheel-deflecting roller element has a stroke length that presumably varies according to the fluid cylinder supply pressure and the cylinder energization time. The supply pressure can be various for different groups of cylinders, as by using a common pressure source and individual pressure reducing valves or by using a number of different pressure sources (pumps). The cylinder energization time can be controlled or varied by the programming. Different roller elements can be made to have different stroke lengths during different portions of the program.

Acceleration and final velocity achieved by the deflection element are believed to be a function primarily of the fluid supply pressure.

During oscillatory movements of the rollers the vehicle should preferably be restrained against translational movement in the front-to-rear direction and in the transverse side-to-side direction. FIG. 1 illustrates the endmost rollers 16 powered upwardly by their fluid cylinders to act as vehicle restraining devices. In practice chains, abutments or other mechanisms would probably be employed.

FIG. 3

FIG. 3 schematically illustrates a terrain-simulating testing device similar to the FIG. 1 device except that endless belts 10 are interposed between the wheel-deflecting rollers and the vehicle wheels. As shown in FIG. 3, each belt is trained over the wheel-deflecting rollers 16, a drive roller 12, an idler roller 14, and a tension control roller 17. Roller 17 maintains desired belt tension while accommodating vertical oscillatory movements of the wheel-deflecting rollers 16.

Each roller 12 may be connected to a D.C. motor, not shown. When the motor is energized the respective belt is moved to generate rotary motion of the associated vehicle speed. The oscillatory forces imparted to the wheels by rollers 16 are therefore transmitted through the wheel bearings, the vehicle differential, and other parts of the vehicle running gear in a closer resemblance to actual road conditions.

With the D.C. motor de-energized the vehicle engine can be run to produce rotation of the vehicle wheels (coincident with oscillatory motion of rollers 16). The vehicle wheels react on the belts 10 to produce belt movement and mechanical power input to the D.C. motor. The motor thus acts as an electrical generator to provide dynamometer measurement of engine power.

FIGS. 4 THROUGH 9

Figure 6:
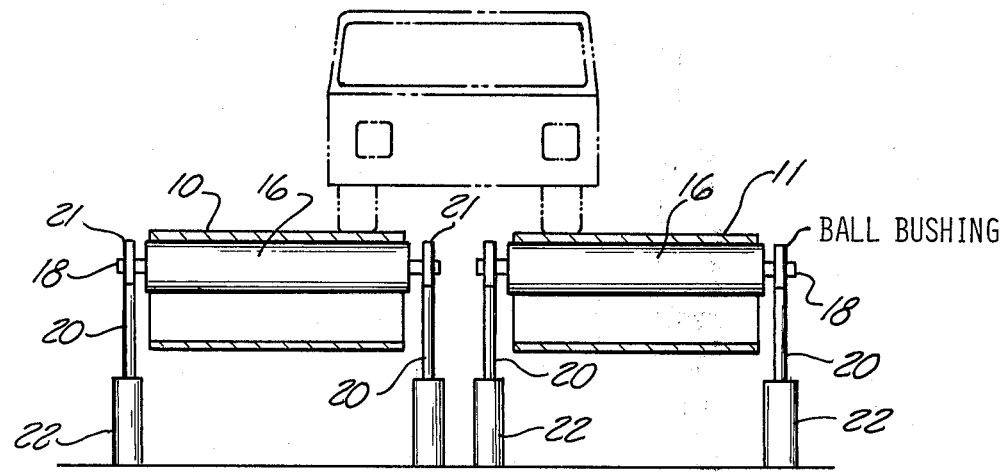
Figure 7:
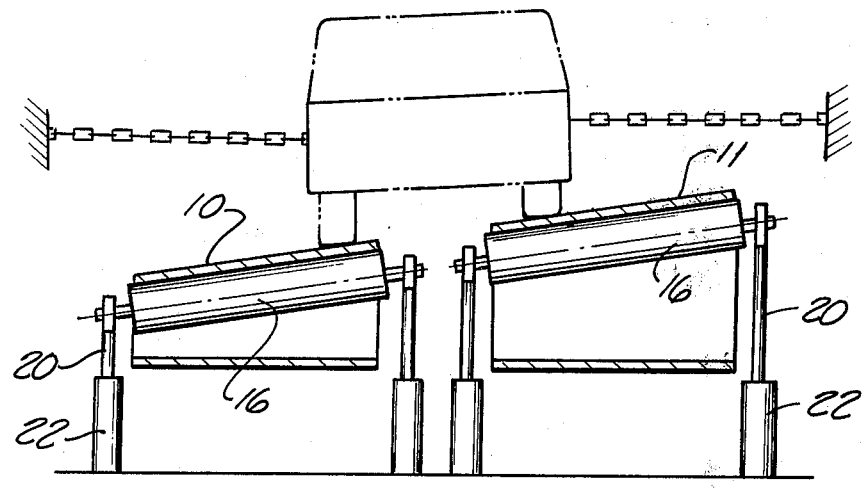

These figures schematically illustrate a terrain-simulating testing device that is similar in many respects to the device of FIG. 3. However, in the FIG. 4 device each belt 10 spans the entire length of the vehicle. As seen in FIGS. 6 and 7, there are two belts arranged on opposite sides of the vehicle's front-to-rear axis. Each belt runs over a separate set of wheel-deflecting rollers 16, a separate drive roller or drum 12, and a separate idler wheel or drum 14. With this arrangement it is possible to more effectively simulate side hill vehicle movement, as illustrated in FIG. 7. Selected ones of the roller-elevating cylinders 22 may be powered to desired positions to maintain the selected side hill inclination. With side hill-simulated conditions attained, selected ones of the wheel-deflecting rollers 16 can be oscillated to impart bump-simulating forces to the vehicle road elements (wheels or tracks). The belts can be visualized as a terrain-simulating roadway.

Figure 8:
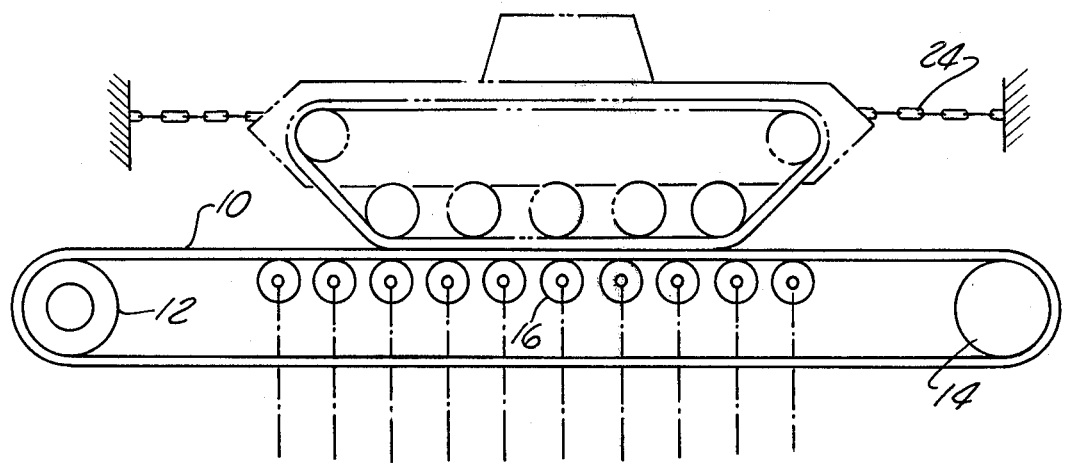
Figure 9:
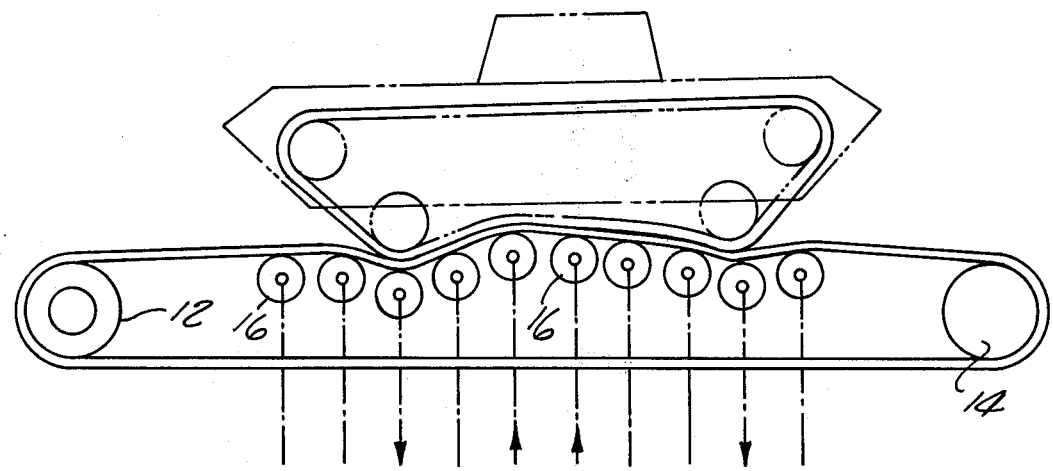

FIGS. 6 and 7 illustrate the testing device when used with a wheeled device. FIGS. 8 and 9 illustrate the same testing device when used with a tracked vehicle such as a military tank. When the testing device is used with a wheeled device only those deflecting rollers located beneath the wheels are oscillated. When the device is used with a tracked vehicle all of the rollers operatively engaged with the vehicle treads can be oscillated. The belts 10 can be driven or left idle, as in the case of the FIG. 3 structure. It is also possible to drive one belt while letting the other belt remain unpowered, or to run both belts in opposite directions. Such an operation can be used to simulate vehicle turning movements, as may be useful for testing the vehicle differential and running gear.

The testing device is preferably constructed to have sufficient width and length to accommodate different vehicle types and sizes, i.e. wheeled or tracked, small or large wheel base, wide or narrow tread spacings, etc.

FIGS. 10 THROUGH 14

The dynamic terrain simulator depicted in these figures. is a practical device corresponding to the schematically illustrated device shown in FIGS. 4 through 9. Accordingly, similar reference numerals are employed where applicable.

Figure 10:
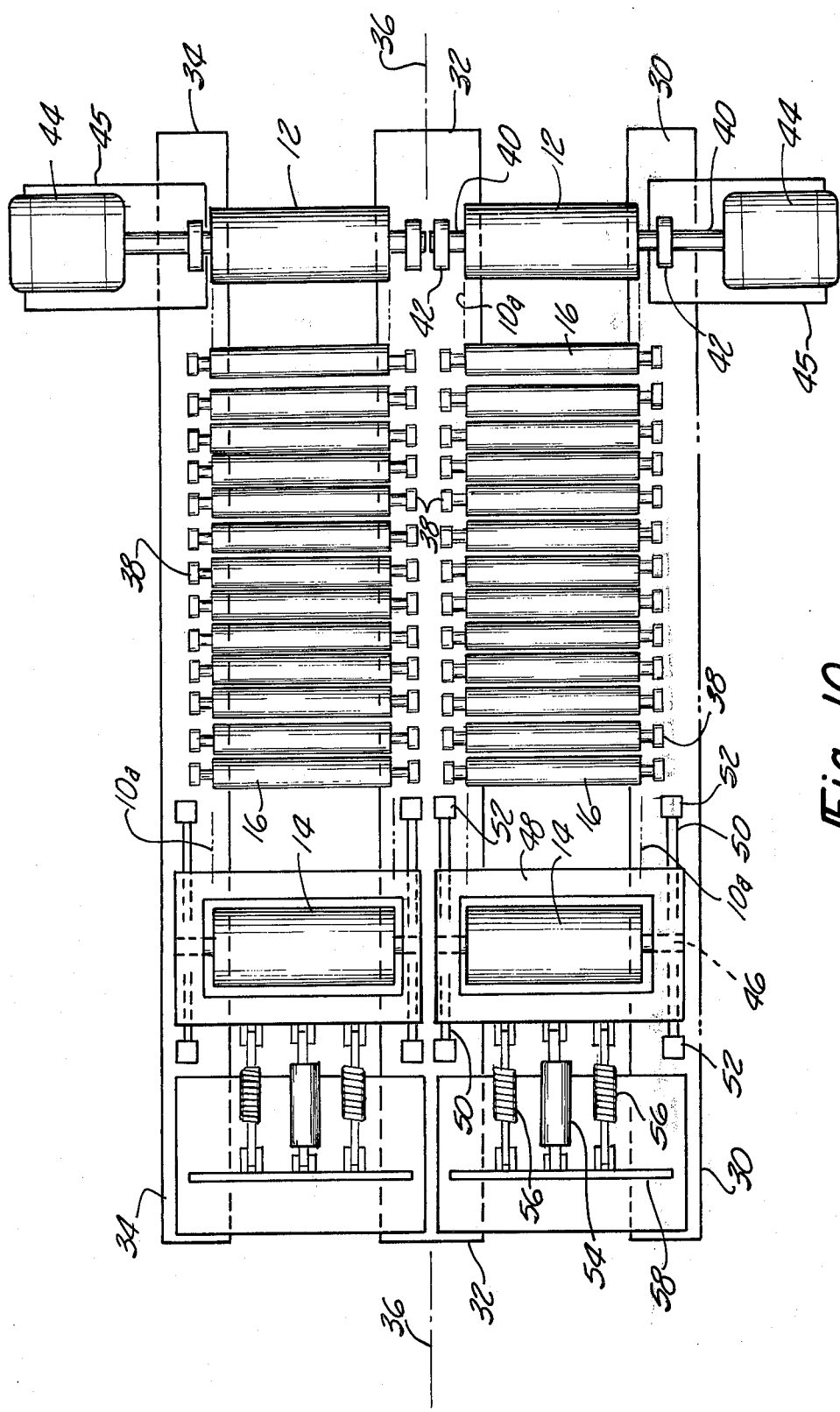
FIG. 10 is a top plan view of a testing device embodying my invention.
Figure 12:
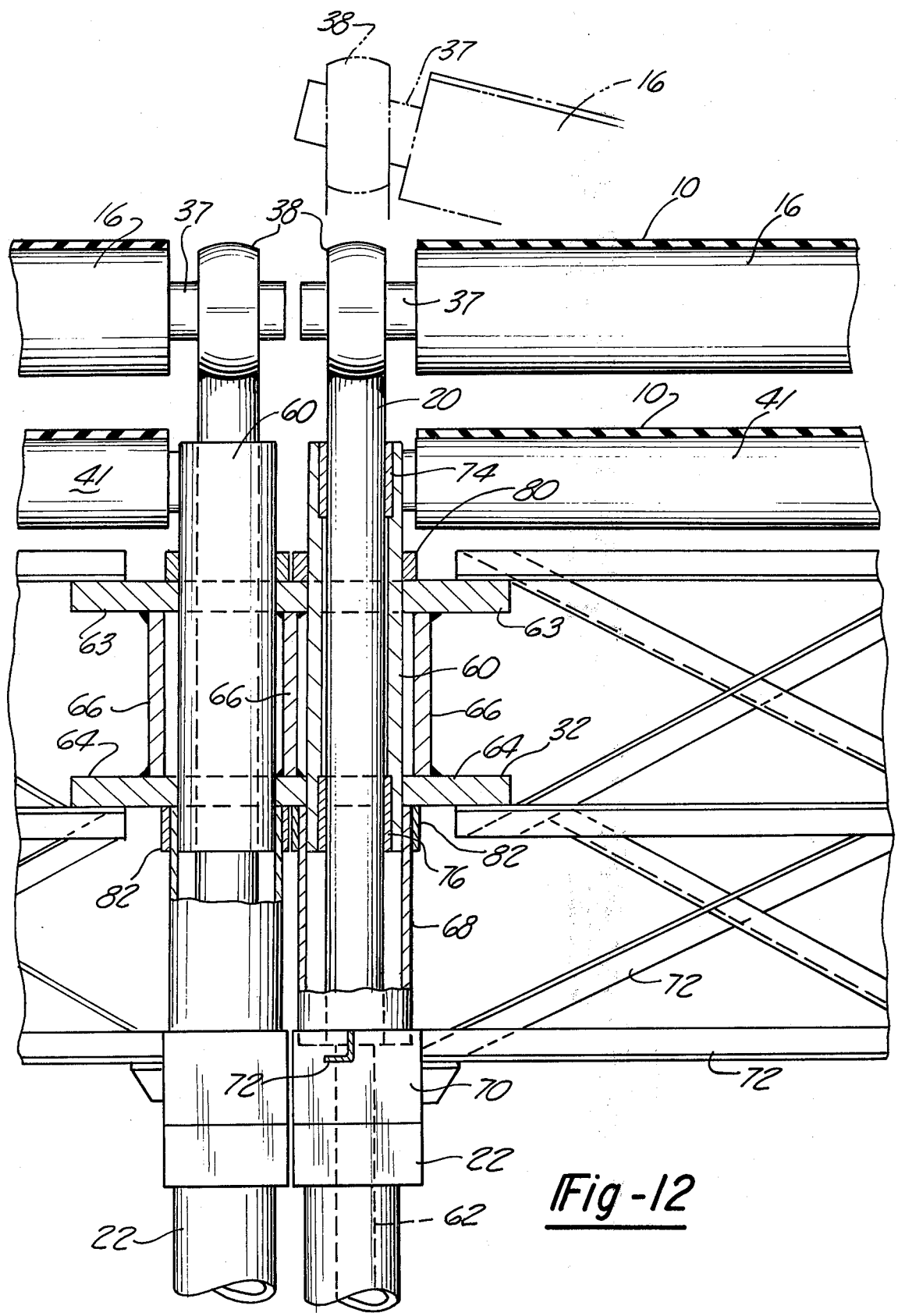
FIG. 12 is a sectional view taken on line 12-12 in FIG. 11.

The FIG. 10 testing device is shown with the belts removed in order to avoid obscuring other components. The lateral side edges of the belts are depicted by phantom lines 10a. As shown, the testing device comprises three elongated beams 30, 32 and 34 extending the full length of the device for accurately locating and mounting the various rollers, fluid cylinders, support rods, etc. The beams are interconnected by conventional diagonal braces, not shown in FIG. 10, but partially visible in FIG. 12. The entire device is preferably quite large and of heavy gage construction to accommodate large heavy vehicles. For example, in one design each of the three beams has a vertically elongated slide structure 20. As shown in FIG. 12, the slide structure comprises a length of approximately 45 feet; the transverse dimension crosswise of the beams is about 25 feet.

Beam 32 extends along the front-to-rear axis of the vehicle (not shown). The beam subdivides the testing device into two similar mirror image sections measured in opposite directons from longitudinal axis 36. Therefore a description of one half section will apply to the other section also.

The vehicle road element-deflecting means in each section includes thirteen rollers 16 having ball-bushing connections 38 with support rods, not visible in FIG. 10. Suitable fluid cylinders located below the beams 30, 32, or 34 provide up-down oscillation of each roller 16. A belt, not shown, runs on the upper surfaces of rollers 16 and around the larger drive roller 12 and idler roller 14. Drive roller 12 is provided with a shaft 40 that is mounted in bearings 42. A D.C. motor 44 having a power output on the order of 500 H.P. is connected to each shaft 12 to rotate said shaft and the associated belt when so desired.

Idler roller 14 is provided with a shaft 46 that has its ends anchored in a rectangular frame 48. Suitable bearings, not shown, are interposed between shaft 46 and the roller. Frame 48 is slidably mounted for horizontal longitudinal movement along stationary guide rods 50 anchored on posts 52; rods 50 are located near the transverse axis defined by shaft 46 to minimize cantilever forces or moment arms imposed on the rods by the belt tension. The slidable mounting of the frame enables roller 14 to shift toward and away from the rollers 12 in accordance with belt condition; i.e. the momentary changes in belt elevation dictated by oscillatory movements of rollers 16. Suitable tension is maintained on the belt by means of a single acting fluid cylinder 54 (connected to a fluid power source, not shown) and a pair of tension springs 56; these mechanisms act in horizontal directions at approximately the same elevation as shaft 46 and guide rods 50, thereby minimizing cantilever forces or moment arms imposed on the idler mechanism by the belt load. The fluid cylinder and springs are trained between frame 48 and a stationary plate 58. It will be understood that cylinder 54 and springs 56 exert oppositely acting forces on frame 48 such as to provide satisfactory belt tension. Various control systems can be employed to vary the fluid cylinder pressure, hence belt tension. In one system a strain gage (load cell) is bonded or otherwise applied to the piston rod of each fluid cylinder to provide an electric signal representative of variations in belt load imposed on the rod; the electric signal is used in a control circuit to vary the hydraulic pressure supplied to the fluid cylinder, thereby maintaining belt tension within a desired range.

Figure 11:
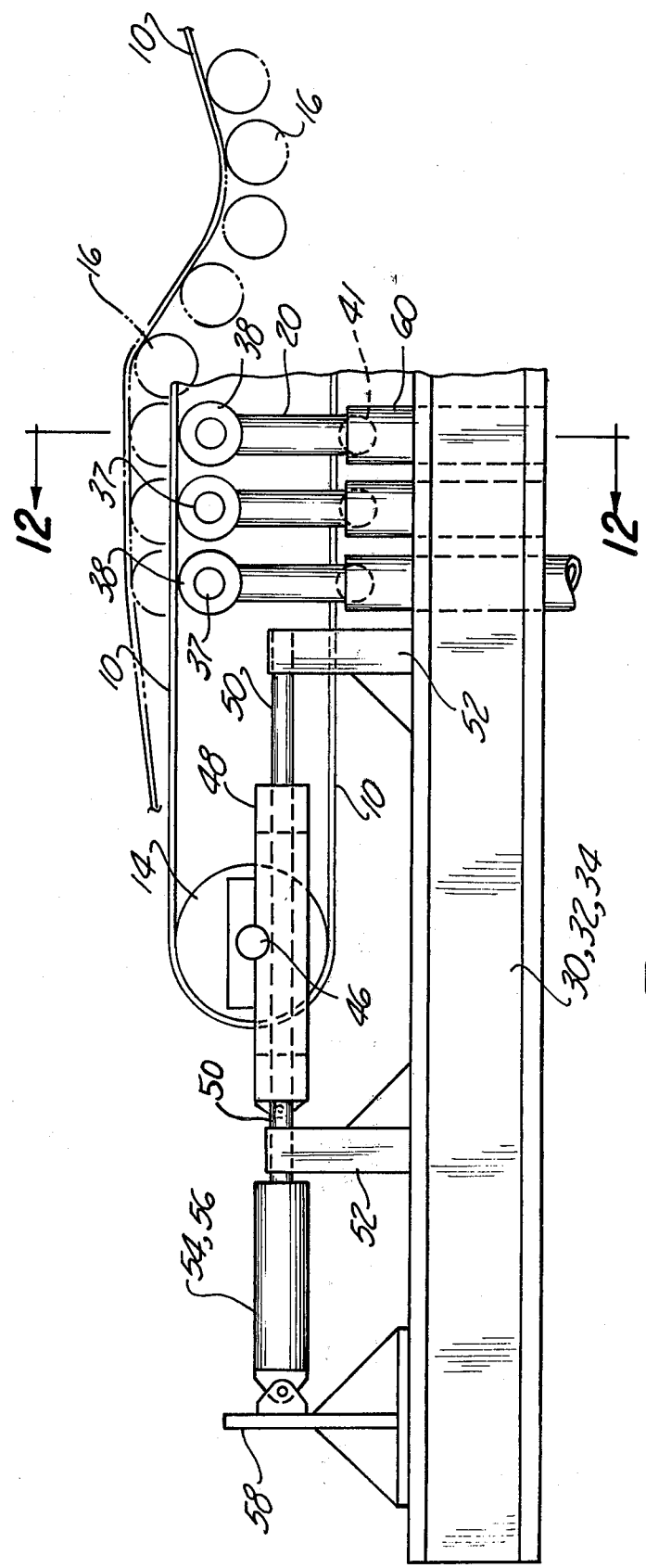
FIG. 11 is a fragmentary side view of the FIG. 10 device.

FIGS. 11 and 12

These FIGS. illustrate the general features of a preferred mounting means for each of the road elementdeflecting rollers 16. Each roller 16 includes a shaft 37 that extends into a ball bushing 38 (shown in detail in FIG. 13). Each ball bushing assembly 38 is carried on the upper end of a vertical support rod 20 that extends downwardly through a tubular guide structure 60 extending through the respective beam 30, 32 or 34. FIG. 12 is taken through the central beam 32; that particular beam is used to mount two rows of tubular guides 60, one row for each set of rollers 16. Beam 32 is somewhat wider than beams 30 and 34, but of the same general construction. The illustrated beam includes an upper plate 63, a lower plate 64, and three interconnecting vertical plates 66; each plate extends the full length of the beam to give the beam sufficient rigidity and deflection resistance commensurate with loadings provided by heavy vehicles weighing 60 tons or more. After fabrication the beam is drilled through at spaced points to provide mounting holes for the various tubular guides 60 and other structures such as bearings 42 and posts 52 (FIG. 10).

Figure 14:
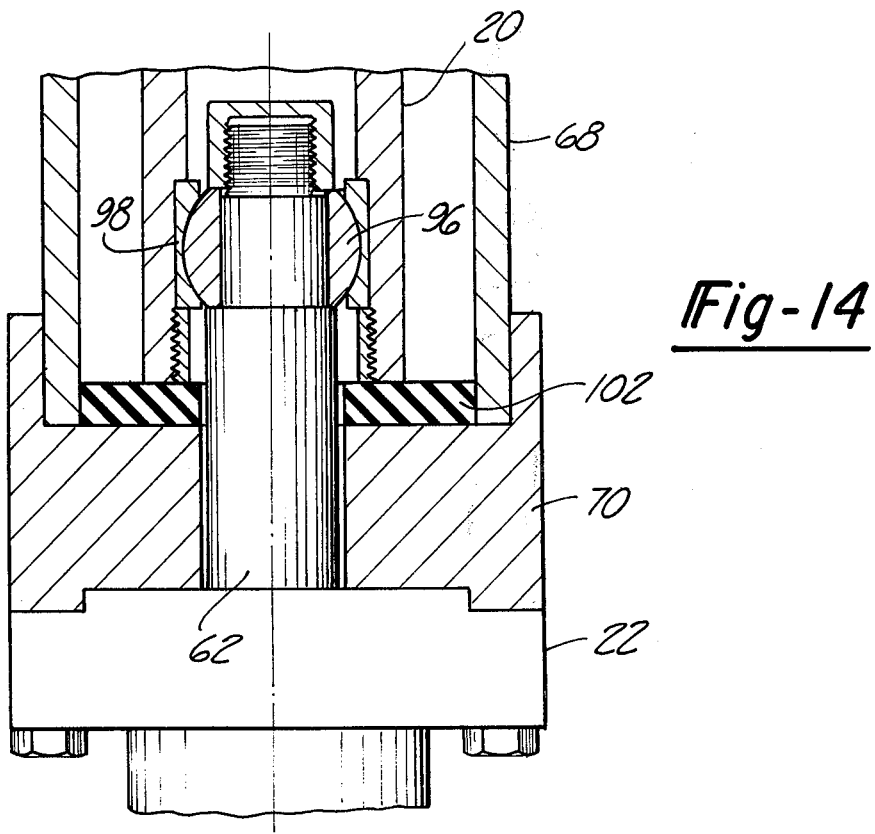

Each support rod 20 extends through a guide 60 to a ball-socket connection with the piston rod 62 of a fluid cylinder 22. The ball-socket connection is not visible in FIG. 12 but is illustrated in FIG. 14. Fluid cylinder 22 is preferably arranged in pendulum fashion below the main support beam 32 such that the cylinder is subjected to vertical tension forces but substantially no lateral horizontal forces. As shown in FIG. 12, the pendulum support is provided by means of a tube 68 welded to tube 60 and having a block-like mounting plate 70.

Each tube 68 may be fabricated to a true vertical condition by tying the various tubes 68 together via the cross bracing shown fragmentarily at 72 in FIG. 12. The cross bracing preferably extends in the plane of the paper (FIG. 12) and angularly thereto; i.e. at right angles and along diagonal lines.

Figure 13:
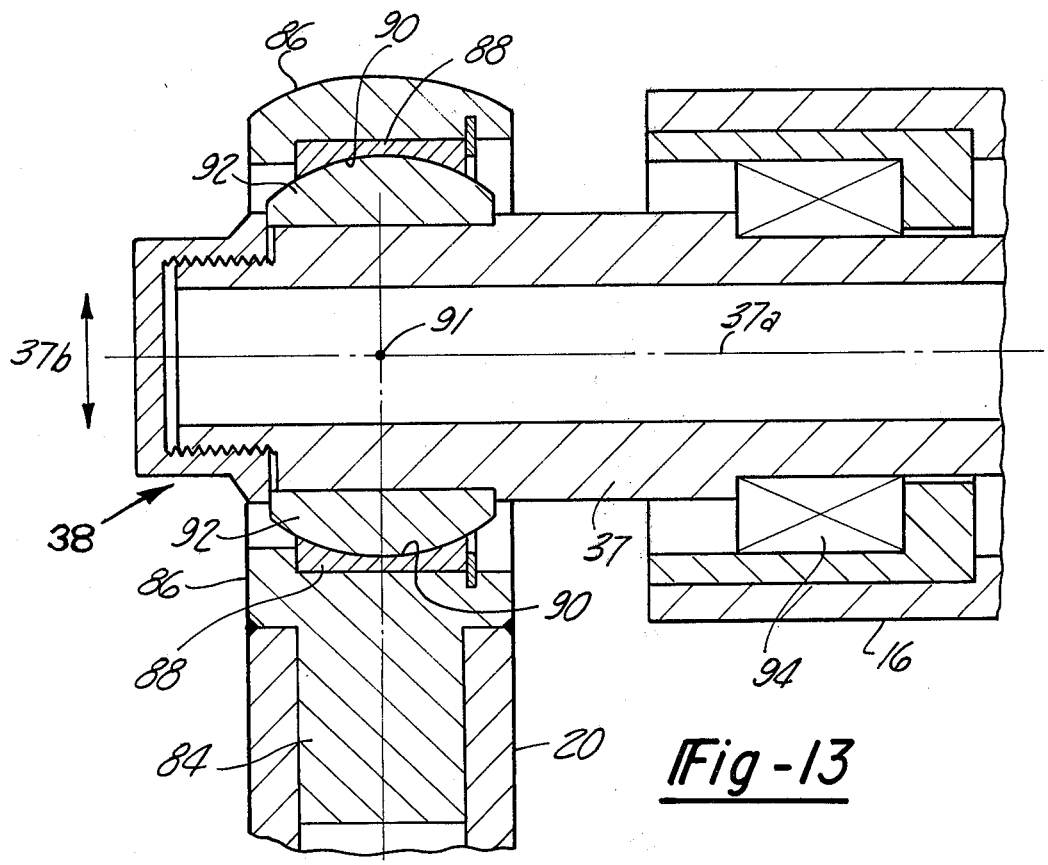
FIGS. 13, 13a and 14 are fragmentary sectional views of the FIG. 12 structure.

Each support rod 20 transmits vertical load forces from its roller 16 to the piston rod 62. The connection between rod 20 and roller 16 is shown in FIG. 13; the connection between rod 20 and piston 62 is shown in FIG. 14. Each support rod 20 is guided and reinforced against lateral deflection or displacement by its mounting structure. As shown in FIG. 12, each support rod 20 is slidably engaged with bushings or bearings 74 and 76 located at the upper and lower ends of tube 60. The vertical spacing of bushings 74 and 76 contributes to enhanced guiding, lessened wear and improved lateral support for oscillating element 20. The vertically centralized location of tube 60 in beam 32 also contributes to stability because the tube is anchored at two vertically spaced areas of the beam, i.e. in the plane of plate 63 and in the plane of plate 64. The exposed ends of each tube 60, above and below beam 32, may be reinforced if desired by the addition of reinforcing sleeves or blocks 80 and 82. The blocks may be square in plan configuration to accommodate bolts that thread into plates 62 and 64. Preferred construction detail is such that tubes 60 transmit substantially the entire side loadings onto the associated beam 30, 32 or 34 (FIG. 10). The beams are preferably constructed of heavy plate to absorb the loads, particularly vertical loads absorbed by vertical plates 66. As shown in FIG. 10, each beam extends the full length of the testing device for absorbing the loads and accurately locating the various guide tubes, rollers, bearings, etc. Each of the large electrical motors 44 (FIG. 10) may be mounted on a reinforced stand or pedestal structure 45 that is rigidly tied to the adjacent beam 30 or 32.

FIGS. 11 and 12 collectively illustrate mechanisms for supporting rollers 41 that guide the belt 10 during its return movement. As shown in FIG. 11, each support tube 60 supports one end portion of a return roller; the other end portion of the return roller is supported by another tube 60 located directly across from the illustrated tube. The support structure preferably comprises a stationary shaft spanning the space between tubes 60, and a roller rotatably mounted on said shaft. The number of return rollers is not deemed critical. Thus, it is probably not essential that each tube 60 function as a return roller support.

FIG. 13

FIG. 13 illustrates the general structure of the ball bushing assembly utilized between each roller 16 and its support rod 20. The rod is of hollow tubular construction, providing a socket at its upper end for receiving the pin-like extension 84 of a hollow circular head element 86. An annular race member 88 having a spherical bearing surface 90 is suitably locked in head element 86. Rotatably and slidably received within race member 88 is a spherical bearing element 92 carried by transverse shaft 37.

Anti-friction bearings 94 are interposed between shaft 37 and roller 16. Therefore the roller is free to rotate around the shaft axis 37a without transmitting such rotation to the shaft. The shaft is free to move translationally in the vertical direction 37b in accordance with the power input from the subjacent fluid cylinders 22 and the vehicle load. As will be visualized from FIG. 7, each roller 16 can momentarily assume various tilted conditions, as dictated by the programming for the fluid cylinders. For example, the fluid cylinder at one end of a given roller may be programmed for energization at a rate of 10 cycles per second while the fluid cylinder at the other end of that roller may be programmed for energization at a frequency of 25 cycles per second. The difference in cycle rate can produce stroke differences that put one end of the roller out of phase with the other end of the roller, thereby causing the roller to momentarily assume different tilted conditions.

Figure 15:
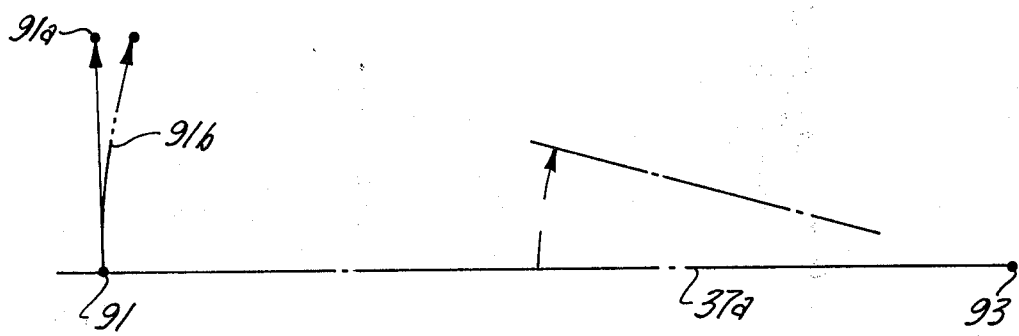
FIG. 15 is a diagrammatic representation of dimensional changes occurring during tilting movement of the FIG. 12 structure.

As indicated, during vertical oscillatory movement of each support rod 20 the rod may change its angular relationship to roller shaft 37. FIG. 13 illustrates shaft 37 in a horizontal attitude extending right angularly to the vertically oriented rod 20. FIG. 12 shows in phantom lines a different angular relationship in which roller 16 has a tilted attitude. The necessary change in angular relationship between rod 20 and roller shaft 37 is accommodated by the ball bushing structure 38, particularly the rotary sliding engagement between race 88 and spherical element 92. As the roller tilts about one of its ends the distance between the centers of the ball bushings at opposite ends of the roller changes slightly. For example, diagrammatic FIG. 15 shows the center 91 of the leftmost bushing movable linearly to position 91a as the roller tilts about center 93 of the rightmost bushing. Phantom line 91b describes the theoretical arcuate path that ball bushing center 91 would have to take if the distance between ball bushing centers were to remain constant during the tilting movement. Such arcuate movement is impossible because of the fact that support rod 20 is constrained to move upwardly in a linear fashion. To permit the necessary changes in the distance between the ball bushing centers it is proposed to have one of the roller shaft ends slidably interfit with its spherical member 92, as shown for example in FIG. 13a.

Figure 13A:
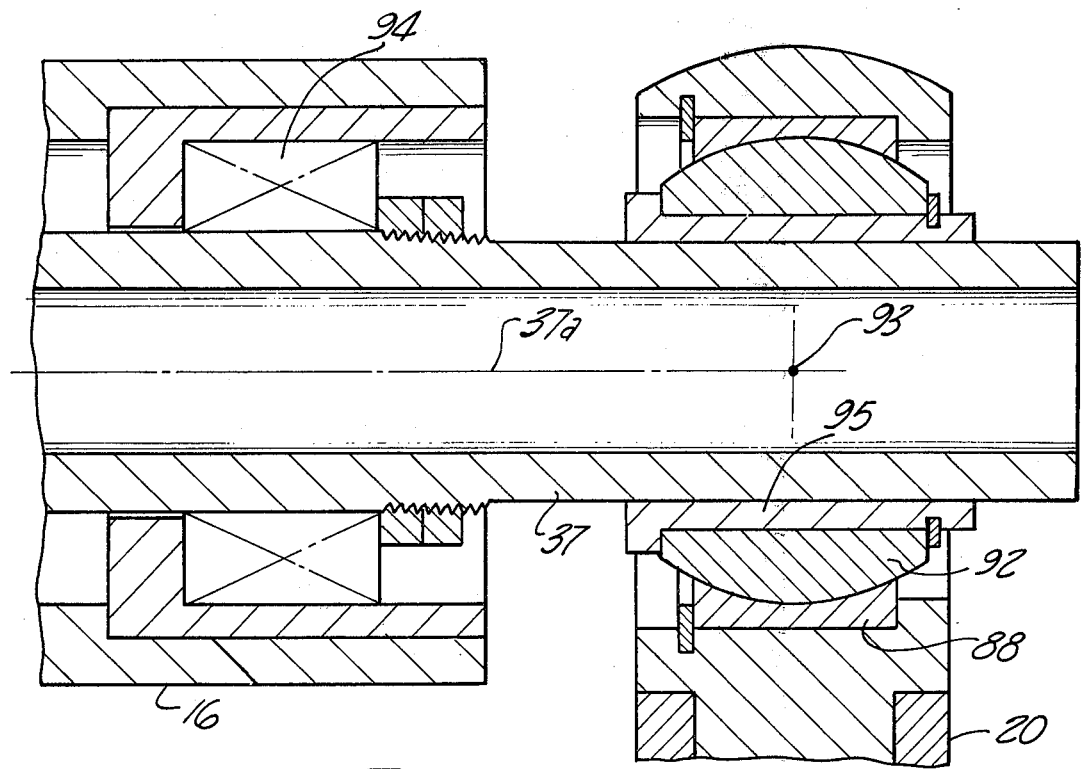

As seen in FIG. 13a, the roller shaft 37 has an axial slidable fit in a bushing 95 that is suitably anchored in the spherical element 92. The ball bushing assembly of FIG. 13A is essentially the same as the assembly shown in FIG. 13 except for the fact that the roller shaft is capable of axial sliding movement relative to the spherical element rather than being affixed to the spherical element. In the actual testing device each roller would have one of its shaft ends affixed to a spherical element as shown in FIG. 13 and the other end of that shaft slidably engaged with a spherical element as shown in FIG. 13A. The bushing assemblies thus maintain their vertical planes in any tilted position of the roller.

FIG. 14

This figure illustrates a suitable connection between support rod 20 and the piston rod 62 of fluid cylinder means 22. As shown, piston rod 62 carries a spherical enlargement 96 that has a universal rotary fit within spherical seat element 98 carried by the lower end portion of support rod 20. The universal connection permits the two rods 20 and 62 to bend and slightly misalign without serious stress or strain on the connected mechanisms. The resilient rubber pad shown at 102 in the drawing is a cushioning device that is affixed to block 70 to absorb shock energy that tube 20 might otherwise impart to block 70 during the last stages of its downstroke. Thus, assuming fluid cylinder 22 is a single acting cylinder, as the pressure below the piston is reduced the vehicle weight will cause rod 20 to move rapidly downwardly toward block 70. If the fluid pressure is sufficiently low, as in the event of hydraulic power supply failure, tube 20 could possibly bottom against block 70 with considerable impact force, thereby possibly excessively compressing the residual oil mass below the piston and/or stressing other mechanisms. Resilient pad 102 absorbs shock energy to preclude damage to the structure during shutdown periods.

FEATURES OF THE INVENTION

FIGS. 1 and 2 illustrate the capability of the testing device for imparting shock energy to the wheels or other road elements of a vehicle under test, thereby subjecting the vehicle to the equivalent of months or years of actual driving in a comparatively short number of test hours.

The use of individually controlled fluid cylinders, shown in FIGS. 1 and 2, provides a programming versatility that enables the technician to vary and/or reproduce test conditions with little or no alteration in the testing device. Such programming versatility is not readily achieved in other types of test machines wherein input forces to the vehicle are varied by mechanical adjustments in the testing machine.

The use of powered belts between the wheel-deflecting rollers and the vehicle wheel, as shown in FIG. 3, is advantageous in achieving rotation of the vehicle wheels co-incident with oscillatory motions produced by the rollers. Vehicle wheel rotation advantageously loads the bearings, shafts, joints, etc. With the vehicle engine running the belts transmit mechanical power to motors 44 (FIG. 10) to enable the motor to act as a generator and dynamometer. Rollers 16 can be oscillated while the vehicle engine is operating, to thus severely test the engine components, such as engine mounts, water pump, etc., for ruggedness and ability to operate under extreme shock load conditions.

The belt-like roadway, shown in FIGS. 4 and 10, forms an extended surface that can be deflected upwardly at different pre-selected areas along its length. The deflection program can be varied to vary the deflection characteristic in such respects as deflection stroke, time interval between deflection, and location of the deflection(s) along the roadway surface. The testing device has capability for testing a wide range of vehicles, including wheeled and tracked vehicles.

In the appended claims the term "vehicle road elements" refers to the vehicle wheels or treads that contact the road or ground surface. The term "deflector element" refers to rollers 16 or equivalent devices that produce deflection of the road elements. The vertically oscillatable support rods 20 are at times referred to as "elevators" or "slide structure". The term "roadway" is at times used to reference the endless belts 10 or equivalent mechanisms.

I claim:
1. A dynamic terrain simulator for a road vehicle, comprising a series of closely spaced rollers extending transverse to the vehicle's front-to-rear axis when said vehicle is positioned on the simulator; and two independently energized elevators located at opposite ends of each roller for raising or lowering the associated end area of the respective roller; said rollers being operatively engageable with the vehicle's road elements to momentarily lift and lower said road elements, thereby subjecting the vehicle to loads similar to those encountered during service over varying terrain.

2. The simulator of claim 1, and further comprising belt means riding on the upper surfaces of the rollers to physically contact the vehicle's road elements.

3. A dynamic terrain simulator for a road vehicle, comprising two sets of closely-spaced deflection rollers arranged on opposite sides of the vehicle's front-to-rear axis when said vehicle is positioned on the simulator, the axis of each deflection roller extending transverse to the vehicle's front-to-rear axis; and an individually energized fluid cylinder operatively engaging each end of each roller to impart up-and-down forces thereto, said deflection rollers being located below the vehicle's road elements to impart loads thereto that are representative of loads encountered during actual overland operations; the connection between each fluid cylinder and the associated end of the respective roller comprising a vertically movable support rod connected to the fluid cylinder, and a universal joint between the roller and support rod.

4. The simulator of claim 3, and further comprising three parallel horizontal beams, one of said beams extending along the vehicle's front-to-rear axis, and the other two beams extending outboard from said one beam on either side thereof; the aforementioned rollers spanning the spaces between adjacent ones of the beams; each of the aforementioned support rods extending downwardly through one of the beams; a belt-drive roller located at one end of the beam assembly in line with each set of deflection rollers; an idler roller located at the other end of the beam assembly in line with each set of deflection rollers; a belt trained around each drive roller, deflection rollers, and idler roller to underlie the vehicle's road elements; and a belt-tension control device associated with each idler roller to accommodate vertical movements of the deflection rollers.

5. Dynamic terrain simulator means for a road vehicle comprising a terrain-simulating roadway supportably engageable with the vehicle's road elements; means for restraining the vehicle against translational motion along its front-to-rear axis; powered deflector means for rapidly shifting preselected areas of the roadway up and down to impart forces to the vehicle representative of service loads encountered by the vehicle during actual overland operations; said deflector means comprising a set of closely spaced rollers arranged so that the axis of each roller is transverse to the vehicle's front-to-rear axis, and an individually energized power means acting vertically on each end of each roller, whereby each roller can be tilted to various transverse inclinations by selective energization of the individual power means.

6. The simulator of claim 5: each power means comprising a fluid cylinder located below the roller axis, a vertically elongated slide structure connected with the movable portion of the fluid cylinder to impart movement to the associated roller, and a horizontally-reinforced bearing means confining the slide structure to movement in a vertical direction.

7. The simulator of claim 6: and further comprising reinforced beams extending parallel to the front-to-rear axis of the vehicle at the ends of the rollers; each bearing means being mounted in one of the beams, whereby the beams constitute lateral reinforcements for the bearing means.

8. The simulator of claim 7: each bearing means comprising a vertically oriented tubular support structure and bearings mounted therein adjacent its upper and lower ends; each tubular support structure extending through one of the beams.

9. Vehicle toughness test means comprising parallel support beams; vehicle wheel-deflecting rollers spanning said beams; each beam comprising upper and lower plate areas; vertically oriented guide tubes extending through the upper and lower plate areas of the beams; roller-support rods mounted for reciprocating movements in the guide tubes; and power means connected to the lower ends of the support rods for imparting vertical movements thereto.

10. The test means of claim 9, and further comprising bushings at the upper and lower ends of the guide tubes for effecting spaced guidance of the roller-support rods.

11. Vehicle toughness test means comprising parallel support beams; vehicle wheel-deflecting rollers spanning said beams; and roller-supporting rods mounted for reciprocatory movements in the beams.

12. The test means of claim 11 wherein each beam comprises an upper plate, a lower plate, and a plurality of vertical plates extending therebetween.

* * * * *